United States Patent
Gerdeman et al.

(10) Patent No.: US 9,297,428 B2
(45) Date of Patent: Mar. 29, 2016

(54) TORQUE CONVERTER HAVING CLUTCH BACKING PLATE FIXED TO COVER AND METHOD OF FORMING

(71) Applicant: Schaeffler Technologies GmbH & Co. KG, Herzogenaurach (DE)

(72) Inventors: Daniel Gerdeman, Wooster, OH (US); David Avins, Burbank, OH (US); Daniel Sayre, Copley, OH (US); Matthew Smith, Columbus, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/281,540

(22) Filed: May 19, 2014

(65) Prior Publication Data

US 2014/0345997 A1   Nov. 27, 2014

Related U.S. Application Data

(60) Provisional application No. 61/826,244, filed on May 22, 2013.

(51) Int. Cl.
| | | |
|---|---|---|
| F16D 33/18 | (2006.01) | |
| F16H 45/02 | (2006.01) | |
| F16D 13/70 | (2006.01) | |
| F16D 25/0635 | (2006.01) | |

(52) U.S. Cl.
CPC .............. *F16D 33/18* (2013.01); *F16H 45/02* (2013.01); *F16D 13/70* (2013.01); *F16D 25/0635* (2013.01); *F16D 2250/0061* (2013.01); *F16D 2300/22* (2013.01); *F16D 2300/26* (2013.01); *F16H 2045/021* (2013.01); *F16H 2045/0226* (2013.01); *F16H 2045/0294* (2013.01); *Y10T 29/49229* (2015.01)

(58) Field of Classification Search
None
See application file for complete search history.

(56) References Cited

U.S. PATENT DOCUMENTS

| | | | | |
|---|---|---|---|---|
| 2,717,673 | A * | 9/1955 | Zeidler | 192/3.3 |
| 5,902,498 | A * | 5/1999 | Mistry et al. | 219/121.64 |
| 7,891,473 | B2 | 2/2011 | Maienschein et al. | |
| 2002/0074200 | A1* | 6/2002 | Back et al. | 192/3.29 |
| 2004/0206593 | A1* | 10/2004 | Schmid et al. | 192/3.29 |
| 2004/0216971 | A1* | 11/2004 | Johann et al. | 192/3.26 |

FOREIGN PATENT DOCUMENTS

JP            5192583 B2 *  5/2013

* cited by examiner

*Primary Examiner* — Ramya Burgess
*Assistant Examiner* — Timothy M Hannon
(74) *Attorney, Agent, or Firm* — Davidson, Davidson & Kappel, LLC

(57) ABSTRACT

A torque converter is provided. The torque converter includes a front cover for connecting to an engine crankshaft; a clutch plate; a clutch backing plate limiting axial movement of the clutch plate away from the front cover; and a connector rigidly connected to the front cover and including a rivet portion for fixing the clutch backing plate to the front cover. A method of forming a torque converter is also provided.

7 Claims, 3 Drawing Sheets

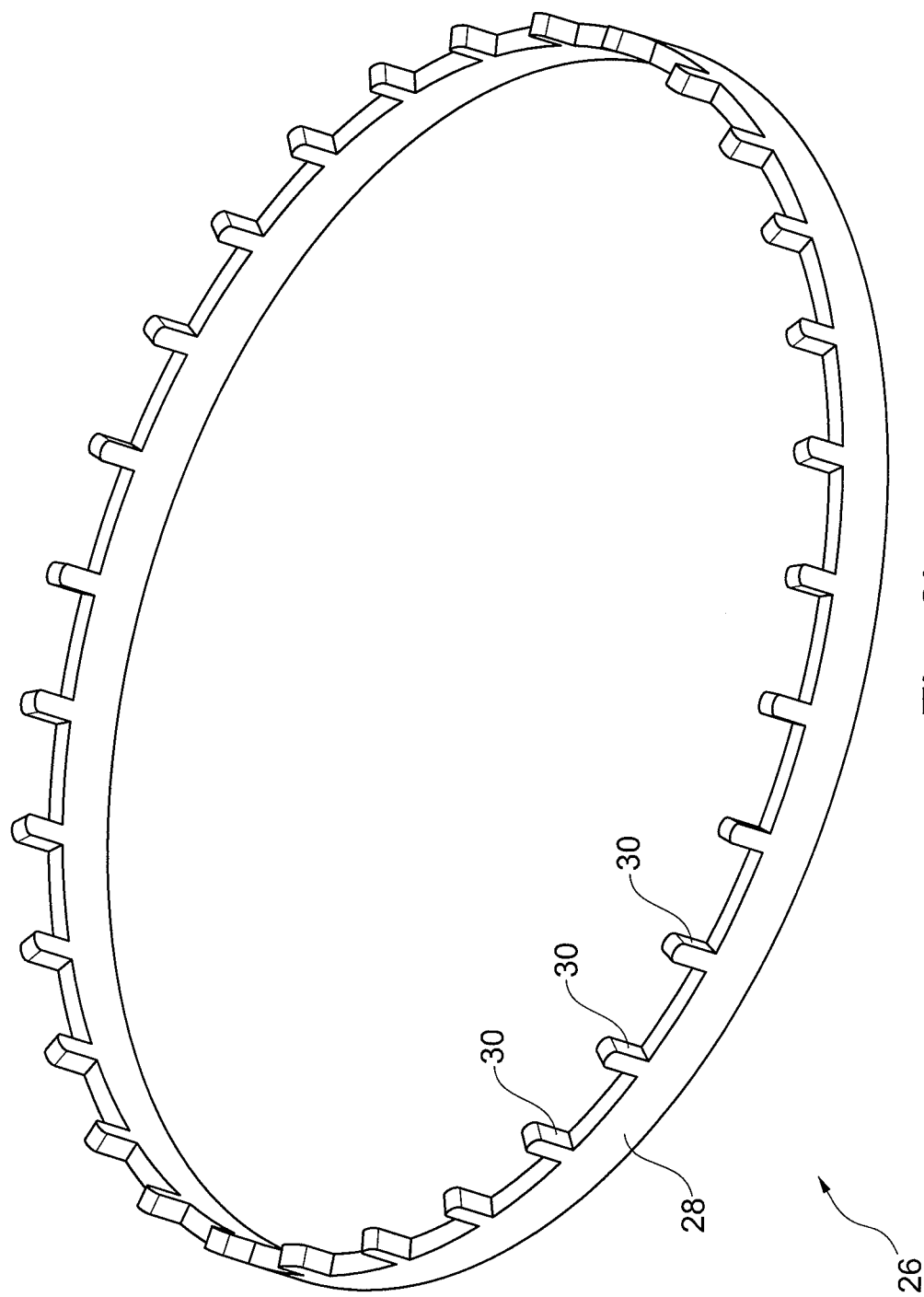

TORQUE CONVERTER HAVING CLUTCH BACKING PLATE FIXED TO COVER AND METHOD OF FORMING

This claims the benefit to U.S. Provisional Patent Application No. 61/826,244, filed on May 22, 2013, which is hereby incorporated by reference herein.

The present disclosure relates to torque converters, and more particularly to a method of fixing a clutch backing plate to a torque converter cover.

BACKGROUND

Back plates for clutch packs are typically driven by a spline connection and held axially by a snap ring. One such example is shown in U.S. Pat. No. 7,891,473.

SUMMARY OF THE INVENTION

A torque converter is provided. The torque converter includes a front cover for connecting to an engine crankshaft; a clutch plate; a clutch backing plate limiting axial movement of the clutch plate away from the front cover; and a connector rigidly connected to the front cover and including a rivet portion for fixing the clutch backing plate to the front cover.

Embodiments of the torque converter may also include one or more of the following advantageous features:

The connector may be a rivet tube. The rivet tube may be welded directly to the front cover. The rivet tube may include a cylindrical portion and the rivet portion may extend axially from the cylindrical portion. The rivet portion may include a plurality of circumferentially spaced rivet protrusions. Each of the rivet protrusions may include a shaft extending axially through the clutch backing plate and a head contacting a surface of the clutch backing plate facing axially away from the front cover. The torque converter may include a piston plate for engaging the clutch plate, the piston plate being axially slidable away from the front cover to force the clutch plate against the clutch backing plate. The piston plate may include a sealing outer radial surface, the sealing outer radial surface being axially slidable along an inner radial surface of the connector. The front cover, a side of the piston plate facing the front cover and the inner radial surface of the connector may define sides of a first pressure region. A side of the piston plate facing away from the front cover may define a side of a second pressure region, the piston plate axially sliding away from the front cover to force the clutch plate against the clutch backing plate when a pressure in the first pressure region is greater than a pressure in the second pressure region.

A method of forming a torque converter is also provided. The method includes rigidly connecting a first portion of a connector to a front cover of the torque converter; and fixing a clutch backing plate of the torque converter to the first portion of the connector with a second portion of the connector.

Embodiments of the method may also include one or more of the following advantageous features:

The method may further include elastically connecting a piston plate to the front cover before fixing the clutch backing plate to the first portion. The piston plate may have an outer radial seal and the piston plate and the connector may be arranged such that the outer radial seal contacts an inner radial surface of the connector. The method may further include providing a clutch plate adjacent to the piston plate before fixing the clutch backing plate to the first portion. After the fixing the clutch backing plate to the first portion, the clutch plate may be axially between the piston plate and the clutch backing plate. The first portion of the connector may be a cylindrical portion circumferentially surrounding an axis of the torque converter. The second portion of the connector may be a fastener portion with a distal end and the fixing the clutch backing plate to the first portion may include passing the fastener portion through the clutch backing plate and deforming the distal end to prevent removal of the clutch backing plate. The method may further include connecting the front cover to a crankshaft of an internal combustion engine. The rigidly connecting the first portion to the front cover may include welding the first portion to the front cover. The second portion may be a rivet and the fixing clutch backing plate to the first portion may include riveting the clutch backing plate to the first portion.

BRIEF DESCRIPTION OF THE DRAWINGS

The present invention is described below by reference to the following drawings, in which:

FIGS. 2a and 2b show side and perspective views of a connector of the torque converter.

DETAILED DESCRIPTION

Figure 1:
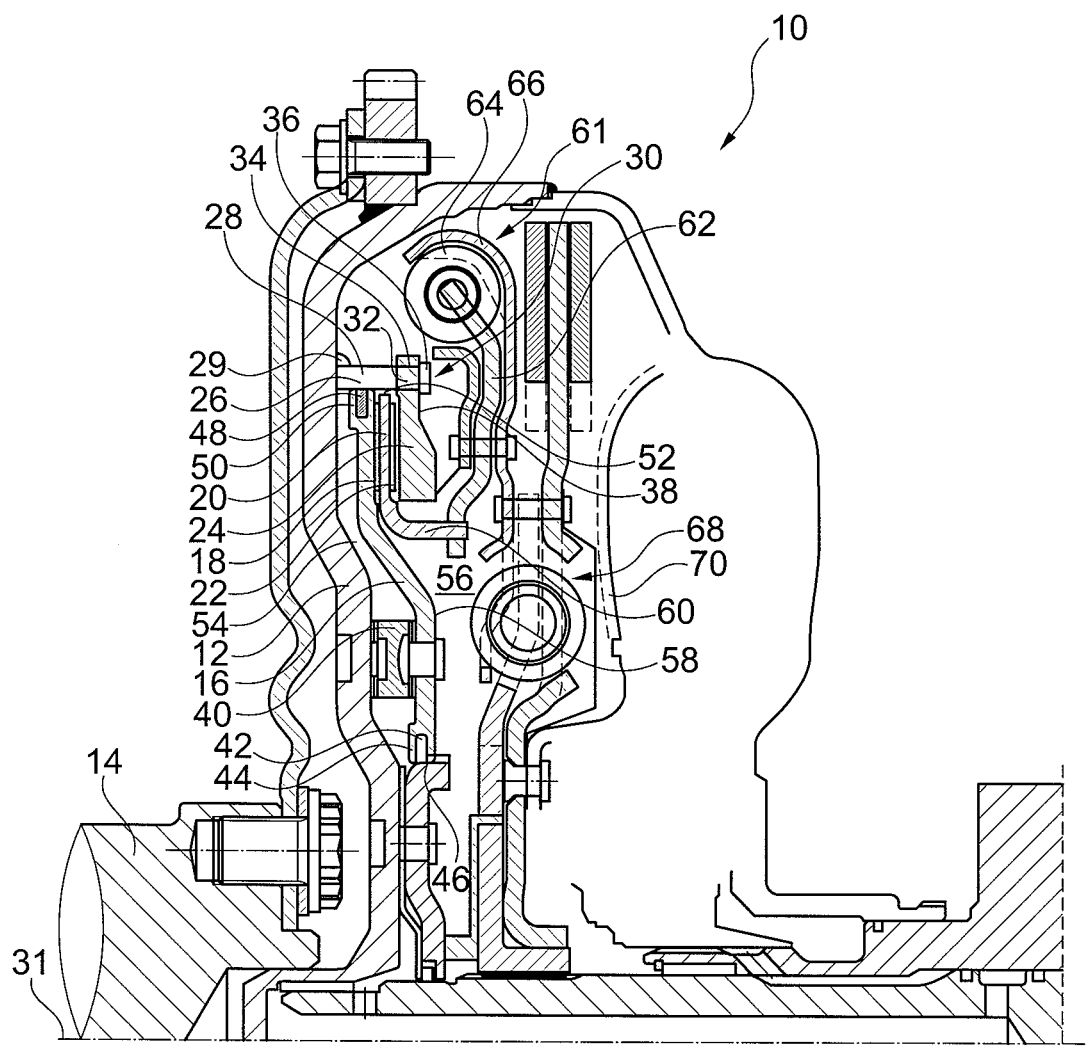
FIG. 1 shows a torque converter in accordance with an embodiment of the present invention.
Figure 2A:
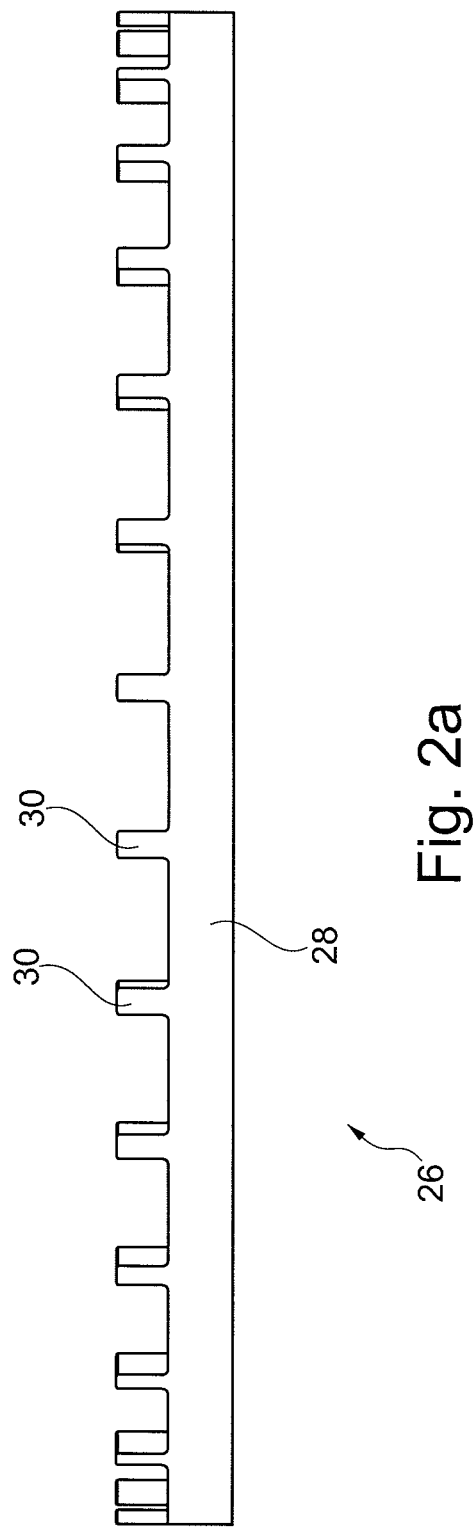

FIG. 1 shows a torque converter 10 according to an embodiment of the present invention. Torque converter 10 includes a front cover 12 for connecting to a crankshaft 14 of an internal combustion engine. A piston plate 16 provided axially inside of front cover 12 is moveable axially toward and away from front cover 12 to engage a friction surface 18 on a first side of a clutch plate 20 and press another friction surface 22 of clutch plate 20, which is on a second side of clutch plate 20 opposite the first side, against a clutch backing plate 24. Clutch backing plate 24 is fixed to front cover 12 by a connector 26 rigidly fixed to front cover 12. Connector 26, which is shown in side and perspective views in FIGS. 2a and 2b, is formed as a rivet tube including a first portion 28, which in this embodiment is a cylindrical or tube portion 28 that circumferentially surrounds an axis 31 of torque converter 10. In this embodiment, tube portion 28 is welded to an inside surface of front cover 12 by a weld 29. Connector 26 also includes a second portion, formed by a plurality of fasteners 30, which in this embodiment are rivets spaced circumferentially from each other around axis 31 for fixing clutch backing plate 24 to tube portion 28. Rivets 30 are integral with connector 26 and each include a shaft 32 extending axially through a respective hole in a radial outer portion 34 of clutch backing plate 24 and a head 36 contacting a surface 38 of clutch backing plate 24 facing axially away from front cover 12. Shaft 32 may have a rectangular cross-section, for example.

Piston plate 16 is elastically connected to front cover 12 by a leaf spring 40 extending axially between front cover 12 and piston plate 16, causing piston plate 16 to be radially fixed with respect to front cover 12, but axially movable to engage clutch plate 20. A radially inner seal 42 is held by a radially inner end 44 of piston plate 16 so that radially inner end 44 may sealingly slide along an inner radial support surface 46. A radially outer seal 48 is also held by a radially outer end 50 of piston plate 16 so that radially outer end 50 may sealingly slide along an outer radial support surface 52 formed by the inner radial surface of tube portion 28 of connector 26.

Seals 42, 48 seal a first pressure region 54, which is defined by front cover 12, piston plate 16, the inner radial surface 52 of tube portion 28 and inner radial support surface 46, from a second pressure region 56 partially defined by surface 58 of piston plate 16 facing away from front cover 12. When the fluid pressure in first pressure region 54 is greater than the fluid pressure in second pressure region 56, piston plate 16 engages clutch plate 20, forcing friction surface 22 of clutch plate 20 against clutch backing plate 24. The engagement of clutch plate 20 by piston plate 16 allows for the torque transmitted from front cover 12 to piston plate 16 and to connector 26 to be transferred to clutch plate 20.

In this embodiment, an axial extension 60 of clutch plate 20 transfers circumferential forces to a damper 61 by engaging a radially extending drive tab 62 for driving springs 64 held by a spring retainer 66. Accordingly, clutch plate 20 transfers circumferential forces from front cover 12 to damper 61, which circumferentially drives another damper 68. Damper 68 in turn circumferentially drives a turbine 70, completing the transfer of torque from front cover 12 to turbine 70.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A torque converter comprising:
   a front cover for connecting to an engine crankshaft;
   a clutch plate;
   a clutch backing plate limiting axial movement of the clutch plate away from the front cover;
   a connector rigidly connected to the front cover and including a rivet portion contacting the clutch backing plate and fixing the clutch backing plate to the front cover; and
   a piston plate for engaging the clutch plate, the piston plate being axially slidable away from the front cover to force the clutch plate against the clutch backing plate,
   the piston plate including a sealing outer radial surface, the sealing outer radial surface being axially slidable along an inner radial surface of a tubular portion of the connector, the rivet portion being formed on an end of the tubular portion so as to hold the clutch backing plate against the tubular portion.

2. The torque converter as recited in claim 1 wherein the tubular portion is welded directly to the front cover.

3. The torque converter as recited in claim 1 wherein the rivet portion extends axially from the tubular portion.

4. The torque converter as recited in claim 3 wherein the rivet portion includes a plurality of circumferentially spaced rivet protrusions.

5. The torque converter as recited in claim 4 wherein each of the rivet protrusions includes a shaft extending axially through the clutch backing plate and a head contacting a surface of the clutch backing plate facing axially away from the front cover.

6. The torque converter as recited in claim 1 wherein the front cover, a side of the piston plate facing the front cover and the inner radial surface of the connector define sides of a first pressure region.

7. The torque converter as recited in claim 6 wherein a side of the piston plate facing away from the front cover defines a side of a second pressure region, the piston plate axially sliding away from the front cover to force the clutch plate against the clutch backing plate when a pressure in the first pressure region is greater than a pressure in the second pressure region.

* * * * *